United States Patent [19]

Agarwal et al.

[11] Patent Number: 5,563,818
[45] Date of Patent: Oct. 8, 1996

[54] METHOD AND SYSTEM FOR PERFORMING FLOATING-POINT DIVISION USING SELECTED APPROXIMATION VALUES

[75] Inventors: Ramesh C. Agarwal, Yorktown Heights, N.Y.; Andrew A. Bjorksten, Austin, Tex.; Freg G. Gustavson, Briarcliff Manor, N.Y.

[73] Assignee: International Business Machines Corporation, Armonk, N.Y.

[21] Appl. No.: 354,402

[22] Filed: Dec. 12, 1994

[51] Int. Cl.$^6$ ........................................... G06F 7/52
[52] U.S. Cl. ............................................ 364/748
[58] Field of Search ............................. 364/765, 748, 364/745

[56] References Cited

U.S. PATENT DOCUMENTS

| | | | |
|---|---|---|---|
| 4,149,261 | 4/1979 | Harigaya et al. | 364/745 |
| 4,796,217 | 1/1989 | Takahashi et al. | 364/745 |
| 4,823,301 | 4/1989 | Knierim | 364/765 |
| 4,839,486 | 6/1989 | Hirose et al. | 364/748 |
| 5,012,438 | 4/1991 | Yamaguchi | 364/765 |
| 5,046,038 | 9/1991 | Briggs et al. | 364/765 |
| 5,065,352 | 11/1991 | Nakano | 365/765 |
| 5,128,889 | 7/1992 | Nakano | 364/748 |
| 5,159,566 | 10/1992 | Briggs et al. | 364/752 |
| 5,212,661 | 5/1993 | Taniguchi | 364/745 |
| 5,235,533 | 7/1993 | Sweedler | 364/715.03 |
| 5,249,149 | 9/1993 | Cocanougher et al. | 364/748 |
| 5,258,943 | 11/1993 | Gamez et al. | 364/745 |
| 5,276,634 | 1/1994 | Suzuki et al. | 364/748 |

OTHER PUBLICATIONS

P. Markstein, "Correctly Rounded Elementary Functions", IBM Technical Disclosure Bulletin, vol. 33, No. 1A, Jun. 1990, pp. 353–355.
W. R. Maple, "Extended Precision Divide Algorithm", IBM Technical Disclosure Bulletin, vol. 29, No. 8, Jan. 1987, pp. 3726–3729.

*Primary Examiner*—David H. Malzahn
*Attorney, Agent, or Firm*—Mark E. McBurney; Andrew J. Dillon

[57] ABSTRACT

A method and system for performing floating-point division of a dividend by a divisor within a floating-point unit having multiply and add functions are disclosed. In performing floating-point division, a quotient having a mantissa is produced. The method uses an approximation based on a linear approximation stored within a first table. The first approximation approximates two divided by the divisor. A second table value is also selected from the table lookup. The second table value approximates the reciprocal of the divisor squared. Both the first and second table values operate as linear correction terms. Also according to the present invention, a method and system are disclosed that perform an early exit check during the division operation to confirm whether the resultant quotient has an acceptable accuracy and if the accuracy is unacceptable, then perform a rounding correction based upon a given rounding boundary.

4 Claims, 3 Drawing Sheets

METHOD AND SYSTEM FOR PERFORMING FLOATING-POINT DIVISION USING SELECTED APPROXIMATION VALUES

BACKGROUND OF THE INVENTION

1. Technical Field

The present invention relates in general to data processing systems and performing floating-point operations and in more particular to a table-based system and method for computing floating-point division operations as well as to provide correctly rounded elementary functions. More specifically still, the present invention relates to a system and method for performing floating-point division that relies on an initial approximation for the reciprocal based on two related table values. The approximation is then further refined to a high degree of accuracy for long precision. The computation of correctly rounded elementary functions requires calculating a final result at a given accuracy and then checking whether that accuracy is sufficient for rounding purposes.

2. Description of the Related Art

Traditionally, floating-point division operations have included the computing of a quotient in a computer by first generating an estimate of the reciprocal of the divisor. The reciprocal is refined, in other words, the precision of the mantissa is increased, and eventually multiplied by the dividend to produce a quotient. This method has often been plagued with the problem of getting the last bit of the mantissa correct in all cases of division.

Computers that have used this technique in the past have been notorious for not always producing the expected results and these divisions were most disturbing for situations in which an exact quotient should be expected, but the hardware, using the sort of scheme described above, simply got the last bit wrong some of the time.

Computers that claim to support the IEEE floating-point standard must get the correct results in all cases.

Iterative techniques do not work well for floating-point processors with long pipeline delays. This is because the next iteration cannot be started before the previous iteration is complete.

Additionally, it is desirable and often required to compute some of the elementary functions, such as, for example, divide and square root with perfect accuracy. These computed results must be correctly rounded in the machine as though they were infinitely precise before rounding. For example, if the computational machine has nb bits of precision, then for the above elementary functions, this requires calculating the final result with approximately 2*nb bit accuracy. Typically, this may require many additional cycles beyond the cycles required to obtain nb bit accuracy.

Accordingly, what is needed is a method for performing divide operations in a reduced number of machine cycles than previously required. Additionally, what is needed is an early exit method for doing final rounding.

SUMMARY OF THE INVENTION

It is therefore one object of the present invention to provide a data processing system.

It is another object of the present invention to provide a data processing system that performs floating-point operations.

It is yet another object of the present invention to provide a table-based system and method for computing floating-point division operations as well as to provide correctly rounded elementary functions in a data processing system.

It is yet a further object of the present invention to provide a system and method for performing floating-point division that relies on an initial approximation for the reciprocal based on two related table values. The approximation is then further refined to a high degree of accuracy for long precision.

The foregoing objects are achieved as is now described. According to the present invention, a method and system for performing floating-point division of a dividend by a divisor within a floating-point unit having multiply and add functions are disclosed. In performing floating-point division, a quotient having a mantissa is produced. The invention uses an approximation based on a linear approximation stored within a table lookup file. The first approximation approximates the reciprocal of the divisor times two. A second table value is also selected from the table lookup. The second table value approximates the reciprocal of the divisor squared. Both the first and second table values operate as linear correction terms. Next, an overall reciprocal of the approximation value is determined, which is based upon the first table value and the product of the divisor and second table value. Next, a table approximation error value is determined, which is based upon the divisor and the overall reciprocal approximation value. Next, the method determines a first approximation quotient by multiplying the dividend by the overall approximation value. Then, the method determines a second reciprocal approximation value by adding the reciprocal approximation value to the product of the overall reciprocal approximation value and the table approximation error value. Next, the method generates a second table approximation error value, which is based on the dividend less the product of the divisor and the first approximation quotient value. Finally, the method determines a resultant quotient by adding the first approximation quotient to the product of the second reciprocal approximation and the second table approximation error value.

Also according to the present invention, a method and system are disclosed that perform an early exit check during the division operation to confirm whether the resultant quotient has an acceptable accuracy. If the accuracy is unacceptable, the method and system then perform a rounding correction based upon a given rounding boundary.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
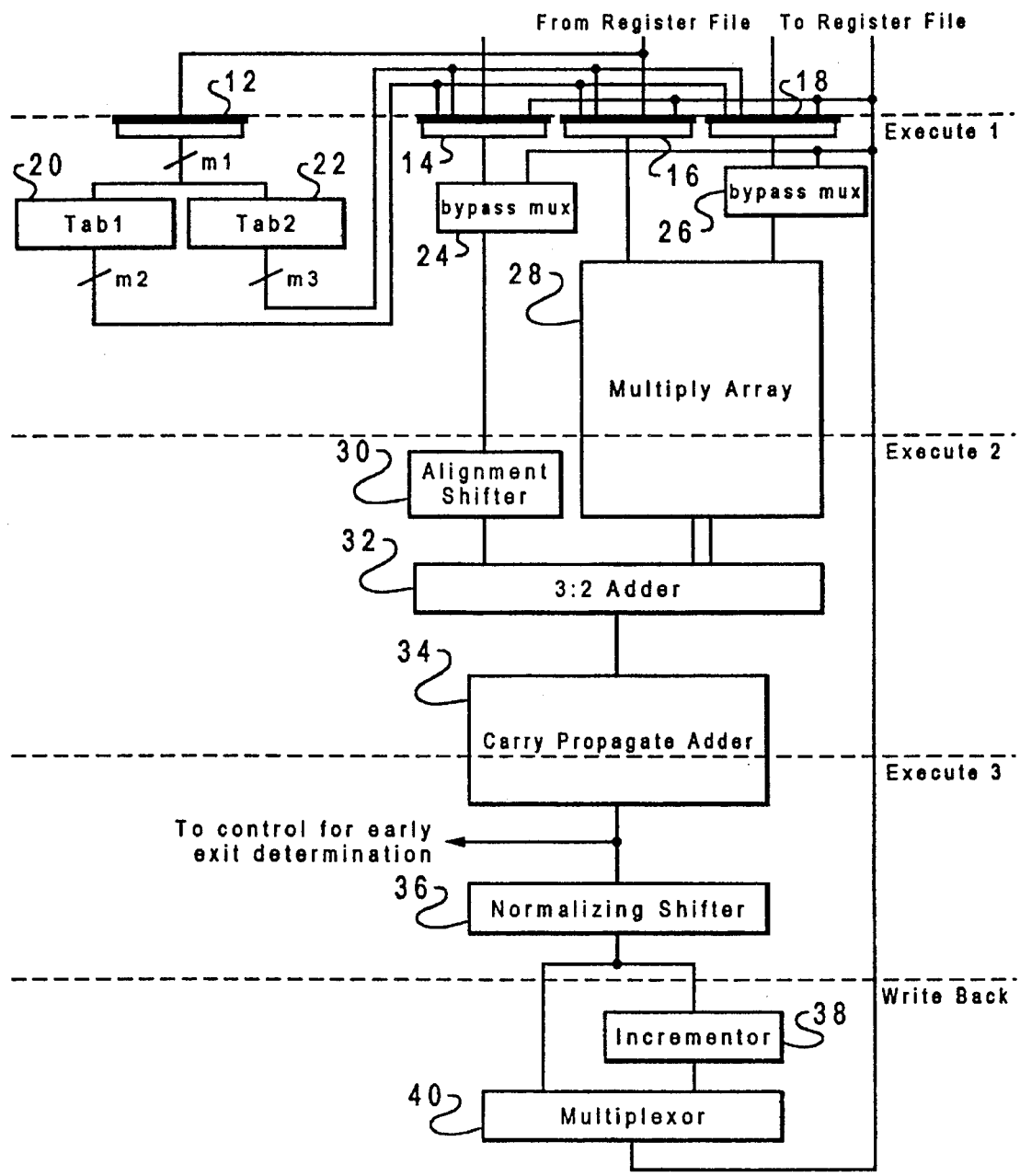
FIG. 1 depicts in accordance with a preferred embodiment of the present invention, a block diagram of a floating-point unit (FPU)

The present invention optimizes a system and method using table generation for long precision divides. The system and method also uses the same table for short precision divides. A floating-point unit (FPU) 10, upon which the present invention is implemented, is depicted in the block diagram of FIG. 1. The floating-point unit is divided into three execution stages and one writeback stage. The execution stages include stage execute 1, execute 2, and execute 3. Stage execute 1 includes a plurality of registers 12, 14, 16, and 18, which receive data information from register files within the central processing unit and which feed information from a first table 20 and a second table 22. Particularly, register 12 feeds to tables 20 and 22, which then feed to registers 14, 16, and 18. A pair of bypass multiplexors 24 and 26 are coupled to registers 14 and 18, as well as to a data line to returning to the register files (not shown).

Register 16 and bypass multiplexor 26 couple to multiply array logic 28, which produces two partial products. Meanwhile, bypass multiplexor 24 feeds to an alignment shifter 30, which is part of the stage execute 2 level. Multiply array 28 phases from stage execute 1 to execute 2 and is further coupled to a 3:2 adder circuit 32. Alignment 30 shifts the data from bypass multiplexor 24 right shift from 0 to many bits before being fed to adder circuit 32. The contents of multiply array circuit 28 then feed to adder circuit 32 as well and are combined with the contents from alignment shifter 30 before proceeding to carry propagate adder 34. Carry propagate adder 34 transitions from execute 2 to execute 3 and is further coupled to a normalizing shifter 36 as well as to a circuit determining early exit. Normalizing shifter takes the proceeds from adder 34 and left shifts the result. The contents from normalizing shifter 36 then proceed to the writeback stage to incrementer 38 and multiplexor 40. Incrementer 38 adds on to its incoming data. Multiplexor 40 shifts between the output of normalizing shifter 36$b$ and incrementer 38 back to the register file. The floating-point operation utilizes a table generation for long precision divides and also for short precision divides and also implements a round scheme that allows for early exit based on selected criteria. The table generation method for precision divides is presented first followed by the rounding scheme for early exit.

Q is set as being equal to a/b, where a and b are numbers represented in IEEE long precision floating-point format with 53 bit mantissa. It is sufficient to consider a and b in the normalized range such that 1.0<a, b<2.0. All other numbers can be reduced to this range with a power of two scaling, without any loss in precision. Generally, a small table is used to obtain an initial reciprocal approximation y=1/b. To generate this table, generally, the interval between 1.0 and 2.0 is subdivided into N equal sub-intervals, where N is $2^{m1}$. Let the sub-intervals be numbered i=0, 1, ..., N–1. Then for each sub-interval, a table value Tab1(i) with m2 bit precision is stored. The table values are chosen such that they best approximate (using m2 bits of data) 1/b in the given sub-interval m1 and m2 are the parameters of the table and they determine the overall accuracy of the table, which is defined to be the maximum error (e=1.0–bxTab1(i)) over all sub-intervals. For a uniformly spaced table, the maximum error occurs towards the low end of the table (for b values close to 1.0). Typically, this method gives at the most min(m 1, m2) bits of accuracy for the table. The current methods use a constant table value in a sub-interval. The system herein uses a linear approximation in each sub-interval, which obtains more than twice as many bits of accuracy for a given table size.

Figure 2:
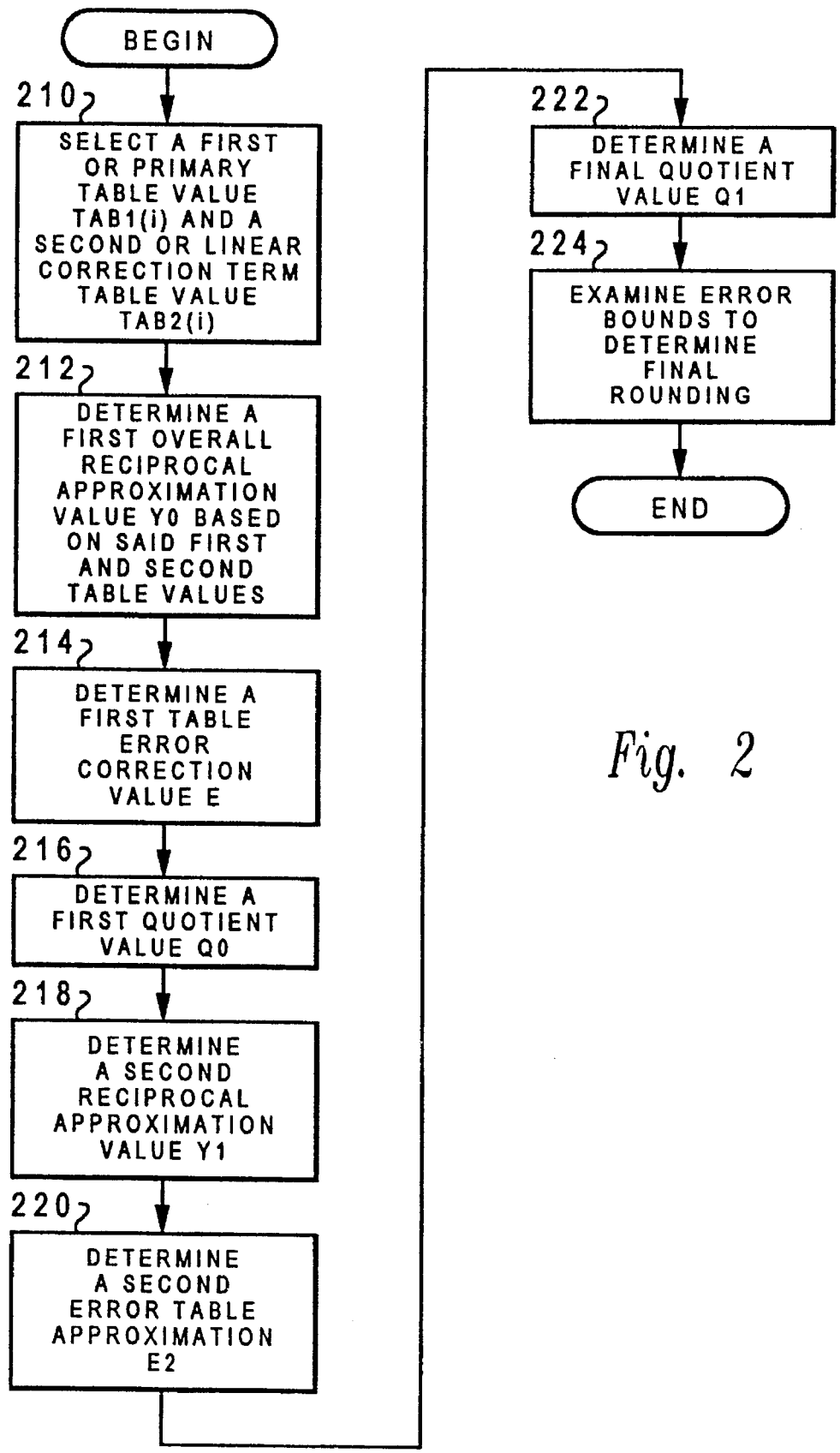
FIG. 2 is a flowchart representing a method for performing long precision division according to the present invention.

A flowchart is depicted in FIG. 2 representing the division method. For each table sub-interval, there is stored two table values Tab1(i) and Tab2(i), where Tab1(i) is the primary table value approximating 2/b in the interval and Tab2(i) (approximately equal to 1/(b*b)) gives the linear correction term. In step 210, the system generates the table values Tab1(i) and Tab2(i), which are based on the leading nine bits of b. Then in step 212, the overall approximation is calculated, which overall approximation y0 is given below.

$$y0=Tab1(i)-bxTab2(i)$$

This requires a multiply-add operation. Although this multiply-add operation can be done with a significantly reduced precision, this embodiment uses the standard 53-bit multiply-add unit of the RS/6000 processor family.

This is a silicon chip space vs speed trade-off. If the system had used a dedicated low precision multiply-add unit to compute this operation, the system could have saved a cycle or two at the expense of some extra hardware. The table values are optimized to minimize the maximum error in each table interval. Tab1(i) and Tab2(i) values are stored with m2 and m3 bits respectively, where m2 is slightly more than m1 and m3 is approximately 2*m2. The overall accuracy of the table is slightly more than 2*m1 bits.

The system does not use uniform table intervals. In the range 1.0 to 1.25, the value of m1 used is 9 (corresponding to a table spacing of 1/512), and for the range 1.25 to 2.0, the value of m1 used is 8 (corresponding to a table spacing of 1/256). By choosing non-uniform table spacings, the system is better able to control the location and magnitude of the maximum error. In this case, the maximum error occurs just above 1.25. In the first range, we have used m2=11 and m3=21. The corresponding values in the second range are 12 and 23, respectively. These refinements in the table generation add very little complexity in a hardware implementation of the table. The total number of table entries is 0.25*512+ 0.75*256=320. This corresponds to an effective m1 value of log2(320)=8.32. In step 214, a table approximation error is calculated. The error in the table approximation is better defined to be e=1.0–b*y0. For this table, the error range is given by, $-1.5767*(2**-20)<e<1.4983*(2-20)$. This corresponds to an effective accuracy of about 19.35 bits using a 320 entry (8.32 input bits) table. Using a conventional approach to achieve this accuracy would require a table of approximate size 2(19.35) or about 600,000 entries. This is prohibitively large for an "on chip" implementation. This approach results in a significant savings in silicon area at a very modest increase (additional delay due to the extra multiply-add operation) in the execution time.

A multiply-add operation is used to obtain y0, which has about 19–20 bits precision. Using y0, a 19–20 bit approximation (step 212) q0 for the quotient is then obtained in step 216. In parallel with this, the accuracy of the reciprocal approximation is doubled and y1 is obtained in step 218 with about 39 bit accuracy. In parallel with this, the error in the quotient approximation, given by e2=a–b*q0, is obtained in step 220. Finally, in step 222, the correction term, y1*e2, is added to q0 to obtain q1, which has a 58-bit accuracy. The overall algorithm is given below in Table 1. This assumes a three (3) cycle delay in using the result of an arithmetic operation as an input operand in a subsequent instruction. It is also assumed that in the multiply-add operation, all 106 bits of the product are generated and take part in the subtraction. This is a standard feature of the hardware for the RS/6000 family of processors.

TABLE 1

| Cycle | Computation | Comments |
|---|---|---|
| 1 | Table Lookup | using leading 9 bits of b, generate table values Tab1(i) and Tab2(i) |
| 2 | y0 = Tab1(i) − b*Tab2(i) | y0 has about 19–20 bit accuracy |
| 3 | — | |
| 4 | — | |
| 5 | e = 1.0 − b*y0 | e is of the order of 2**−20 |
| 6 | q0 = a*y0 | q0 has about 19–20 bit accuracy |
| 7 | — | |
| 8 | y1 = y0 + y0*e | y1 has about 39 bit accuracy |
| 9 | e2 = a − b*q0 | e2 is of the order of a*2**−20 |
| 10 | — | |
| 11 | — | |
| 12 | q1 = q0 + y1*e2 | q1 has about 58 bit accuracy |
| 13 | — | |
| 14 | — | Examine bits 54–58 of q1 to check if an early exit is possible. Otherwise, do the fix-up computation. |

In the above computation, all operands are standard 53-bit IEEE floating-point numbers. In the last computation, q1 represents the result before rounding. All other computations are done in the "round to nearest" mode. It can be shown that the worst case accuracy for q1 is about 58 bits. Since the initial approximation y0 has the worst case accuracy of 19.35 bits (abs(e)<2**(−19.35)), if errors due to intermediate roundings are ignored, the worst case error in the result is given by q*(e3). This expressed in ulps is (2(−3*19.35))*(253)=2(−5.05) ulps. Even after taking into account the intermediate round-off errors, it can be shown that the maximum error in result, abs(q−q1)<2(−5) ulps. Based on these error bounds, bits 54–58 of the result are examined to decide the final rounding (step 224**). The early exit procedure is described below. It can be shown that for 15 in 16 cases (based on the above bound for the maximum error), rounding q1 in the user specified rounding mode will produce the correctly rounded result. In the rare cases (1 in 16), some additional computation has to be carried out to determine the correct rounding. These rare cases occur when the 58-bit result is close to the rounding boundary such that when the worst case error is added/subtracted to q1, the result may cross the boundary.

Figure 3:
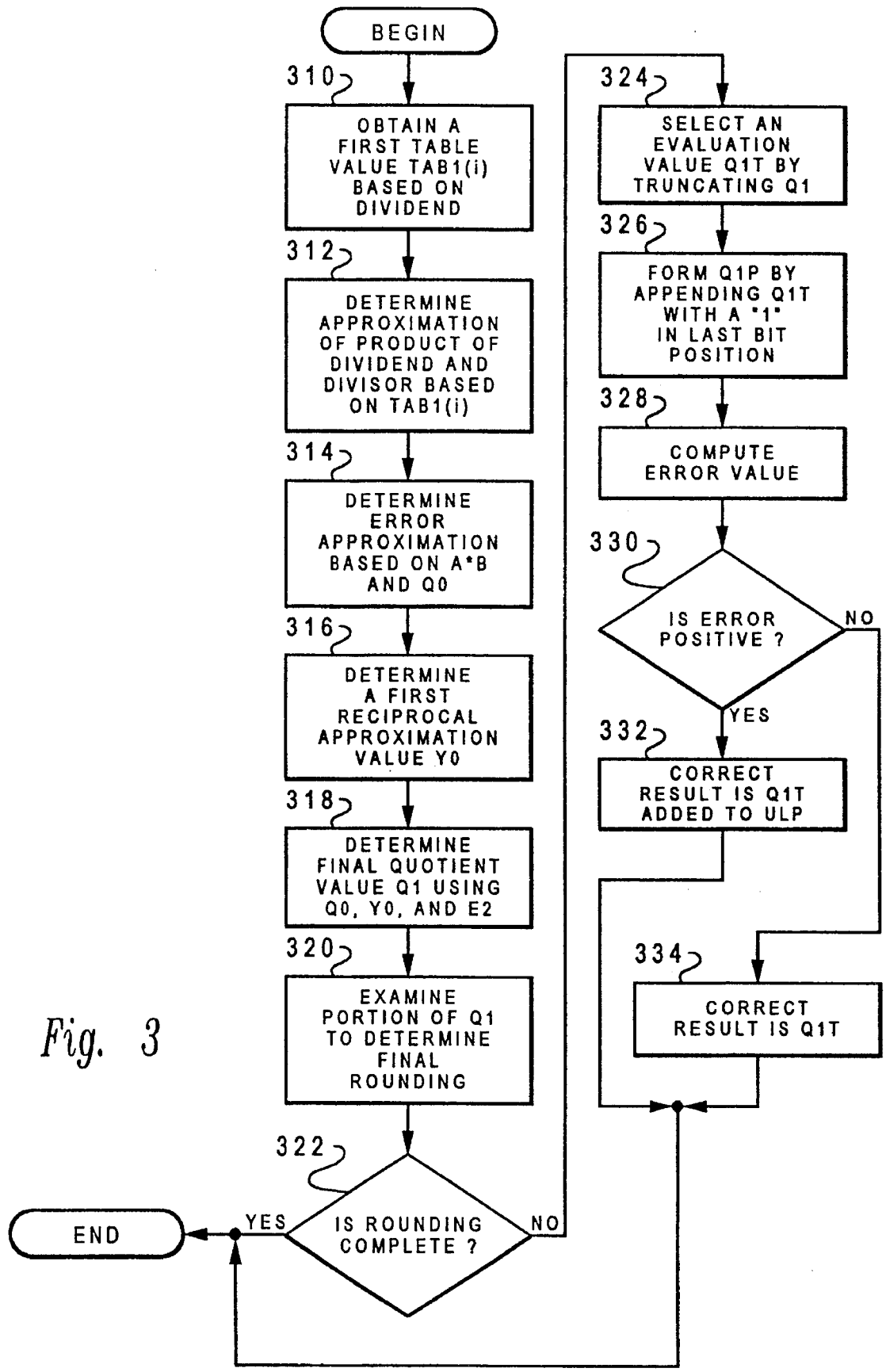
FIG. 3 depicts a block diagram representing a flowchart of the steps used in performing short precision IEEE divide according to the present invention.

For the short precision (24-bit) IEEE divide, the primary goal is to use the above table designed for the long precision divide. FIG. 3 depicts a block diagram representing a flowchart of the steps used in performing short precision IEEE divide according to the present invention. This uses a 9–10 bit approximation q0=a*Tab1(i)*0.5, for the quotient using the first table value Tab1(i), which approximates 2/b. By scaling the exponent of Tab1(i) by a factor of 0.5, the system can approximate 1/b. In the first cycle (step 310, the system accesses the table values and initiates in step 312, a multiply to compute ab=a*b, which is used to compute approximately the error e2 in the quotient approximation as given below (see step 314).

$$e2 = a - b \times q0 = a - b \times a \times Tab1(i) \times 0.5 = a - ab \times Tab1(i) \cdot 0.5$$

By employing this identity, the system can compute e2 without waiting for the q0 computation to be complete. This is not as accurate as the computation using q0, but it is sufficiently accurate for the short precision division. Because of the accuracy requirements in long precision-divide, this short cut in computation is not acceptable. Also, although a and b are short precision operands, all the computation is done in standard 53-bit long precision IEEE arithmetic. On the RS/6000 family of machines, there is no performance advantage in doing short precision computation. In parallel with the above computation, the system, in step 316, can also compute y0 (same as in the long precision division), which is a 19–20 bit approximation to 1/b. Finally, in step 318, the system adds the correction term, y0*e2, to q0. The overall algorithm is given below in Table 2.

TABLE 2

| Cycle | Computation | Comments |
|---|---|---|
| 1 | Table Lookup | Using leading 9 bits of b, generate table values Tab1(i) and Tab2(i). |
| | ab = a*b | In parallel with the table lookup, initiate this computation also |
| 2 | q0 = a*Tab1(i)*0.5 | q0 has about 9–10 bit accuracy |
| 3 | y0 = Tab1(i) − b*Tab2(i) | y0 has about 19–20 bit accuracy |
| 4 | e2 = a − ab*Tab1(i)*0.5 | e2 is of the order of a*2**−9 |
| 5 | — | |
| 6 | — | |
| 7 | q1 = q0 + y0*e2 | q1 has about 28–29 bit accuracy |
| 8 | — | |
| 9 | — | Examine bits 25–28 of q1 to check if an early exit is possible. Otherwise, do the fix-up computation. |

All computations are done in long precision in the "round to nearest" mode. The worst case accuracy for q1 is at least 28 bits. Based on this error bound, the system examines bits 25–28 of q1 to decide the final rounding (step Unless this is the rare case window (bit 25 is zero and bits 26–28 are all ones or bit 25 is one and bits 26–28 are all zeros), rounding of q1 produces the correctly rounded result, assuming that the user specified rounding mode was round to the nearest. In the rare case (1 in 8 cases), the following computation is done to decide the final rounding in step 322, the system sets q1t to be the 24-bit truncated value of q1. Then, in step 324, the system forms a 25-bit number q1p by adding ½ ulp (of short precision data) to q1t (ulp is defined below). This is accomplished by appending '1' to q1t in bit position 25. Then, in step 326, the system computes error=a−b*q1p in regular 53-bit arithmetic. If error is positive, the correctly rounded result is q1u=q1t+ulp, (step 330); otherwise the correctly rounded result is q1t (step 332). It can be shown that the error can never be zero. Similar schemes can be easily worked out for other rounding modes.

In summary, this invention describes a table based method and system to compute long precision and short precision IEEE floating-point division operations on the RS/6000 family of processors. The method uses a linear approximation for the reciprocal in each table interval. The entire calculation is done in the regular 53-bit precision of the hardware and at the end, for a long (short) precision divide, a 58-bit (28-bit for short precision) precision result is obtained in the internal accumulator of the floating-point unit. An early exit rounding method described below is used for the final rounding of the result. The results generalize to other precisions, data formats, table sizes, hardware characteristics, etc.

A method and system for correctly computing rounded elementary function is also provided. This is accomplished by calculating a final result with an accuracy slightly above nb-bit precision and then performing a quick check to see if an early exit is possible. This is based on the need to obtain nb-bit accuracy if the machine has nb bits of precision.

As an example, consider evaluation of divide and square-root on RISC machines of the RS/6000 family. The floating-point arithmetic on these machines uses IEEE long precision data format, which has a 53-bit mantissa for long precision numbers. The invention, however, also generalizes to bases other than two, for example, decimal, octal, hexadecimal, and also to the number of base digits. Another property of RS/6000 family of machines is that the hardware multiply-add operation is done with considerably more than 53-bit precision for input operands. This extra precision result in the accumulator is rounded to 53 bits according to the user specified rounding mode.

For the above elementary functions, the method is organized in such a way that the final multiply-add operation (using standard 53-bit input operands) produces the result with considerably more than 53-bit accuracy. Because of the above property of the RS/6000 hardware, this extra accuracy result is available in the accumulator, before the final rounding. This produces a final unrounded result to several more base digits than what is required. Thus, the method generalizes in this sense also.

Q is the infinite precision result of an elementary function computation, will q1 is the computed result (with extra accuracy). Then, by mathematical analysis, bounds on the error (q-q1) are established. Without loss of generality, q and q1 are assumed positive. Ulp of a machine representable positive number x is defined as: uip(x)=xu-x, where xu is the next higher machine representable number. Ulp of an infinite precision (non-machine representable) number x is defined as: ulp(x)=xu-xt, where xu is the next higher machine representable number and xt is the next lower machine representable number. For IEEE numbers in the range 0.5 to 1.0, an ulp=$2^{**}-53$. The value of ulp changes by the base factor, in this case two, when numbers move into the next higher or lower exponent range. Let the error bounds (derived analytically) on the computed results be expressed as, -delta 1<(q-q1)<delta2, where delta1 and delta2 are positive numbers expressed in ulps of q1. The method readily analyzes and describes the case where delta1 and delta2 are different; however, for example purposes, delta1=delta2 is assumed. It is customary to specify four possible rounding modes. For positive numbers, these rounding modes reduce to three and they can be described as follows:

Round to nearest: In this case, the correctly rounded result is the machine number nearest to q.

Truncate mode: In this case, the correctly rounded result is the biggest machine number not exceeding q.

Rounding up mode: In this case, the correctly rounded result is the smallest machine number not lower than q.

In most of the computing, the default rounding mode is round to nearest. This mode also gives the most accuracy. All three rounding modes are possible, but the round to nearest mode is given. Details for other rounding modes can be readily worked out by one of ordinary skill in the art.

Let delta=$(2^{**}-p)*ulp$ be the smallest power of 2 exceeding both delta1 and delta2. For this technique to work, p must be at least 2. In other words, q1 must be computed with an accuracy of at least 55 bits. In the RS/6000 hardware, q1 is represented with considerably more than (53+p) bit accuracy, although only the first (53+p) bits are accurate. Generally, the method only requires that a given hardware be able to represent at least nb+p base digits. Let q1t be the truncated (53-bit machine representable) version of q1, then the following regions are of interest.

$0=<(q1-q1t)<(0.5-2^{**}-p)*ulp$. In this case, even in the worst case error scenario of an error being+delta, the infinite precision result q will not exceed q1t+ulp/2 and the correctly rounded result in the round to the nearest mode will be q1t. This condition is represented by bit 54 (of the mantissa) being zero and at least one of the bits (55, 56, . . . , 53+p) also being zero.

$(0.5+2^{**}-p)*ulp=<(q1-q1t)<ulp$. In this case, even in the worst case error scenario of error being -delta, the infinite precision result q will not be below q1t+ulp/2 and the correctly rounded result in the round to the nearest mode will be q1t+ulp. This condition is represented by bit 54 being 1 and at least one of the bits (55, 56, . . . , 53+p) also being one.

$(0.5-2^{**}-p)*ulp=<(q1-q1t)<(0.5+2^{**}-p)*ulp$. In this case, depending on the error magnitude and sign, the infinite precision result q can be on the either side of q1t+ulp/2, and therefore, the correctly rounded result can by either q1t or q1t+ulp. If p is large (small delta1 and delta2), the probability of falling in this case is small. This case is represented be either (bit 54 is zero and bits 55, . . . , 53+p are all ones) or (bit 54 is one and bits 55, . . . 53+p are all zeros). In these rare cases, extra computation as outlined below must be carried out to ascertain the correctly rounded result. The probability of a result falling in this rare case window is $2^{**}(1-p)$.

In determining the rare case processing for divide, let q=a/b. Then we compute t1=a-b*q1t. On RS/6000 machines, t1 is exact and machine representable. Many other machines have this desirable feature. This method requires that t1 be computed exactly. The quantity t1 is then compared against r2=b*ulp/2. Since ulp/2 is a power of 2, t2 is obtained simply by taking the mantissa of b and adjusting its exponent. If t1>t2, then q>q1t+ulp/2 and correctly rounded result is q1t+ulp. If t1<t2, then q<q1t+ulp/2 and the correctly rounded result is q1t. In this method, t1 and t2 can never be equal. This is true for other bases, also.

In determining the rare case processing for square-root, let q=sqrt(x), then to decide the correct rounding, x is compared against t1=(q1t+ulp/2)**2; however, q1t+ulp/2 is not a machine representable number and, therefore, this quantity cannot be easily calculated. The quantity t1 is approximated by t2=q1t*q1u, where q1u=q1t+ulp is the next higher machine representable number. Thus, t1=t2+ulp*ulp/4, where t1 and t2 match in first 107 bits and this accuracy is good enough to round correctly in all cases. If x<t2, then q is less than q1t+ulp/2 and q1t is the correctly rounded result. If x>=t2, then q is greater than q1t+ulp/2 and q1t+ulp is the correctly rounded result. Also, q can never be equal to q1t+ulp/2. This statement holds for other bases also. Thus, when x=t2 =t1 ulp*ulp/4, and therefore, x>t1 and the correctly rounded result is q1t+ulp.

The above analysis provides an early exit scheme to round correctly the final result in the computation of an elementary function by examining some of the bits immediately following the required bits (53 bits mantissa for the IEEE long precision data format). In most of the cases, the correctly rounded result is available immediately. Details were given for division and square root. However, the method generalizes to the other elementary functions like exponential, logarithmic and the trigonometric functions. In the rare cases, additional computation may be needed to determine the correct rounding. These results generalize to bases other than two, and to any number of base digits used in the floating-point data representation.

While the invention has been particularly shown and described with reference to a preferred embodiment, it will be understood by those skilled in the art that various changes in form and detail may be made therein without departing from the spirit and scope of the invention.

We claim:

1. In a floating-point unit having multiply and add functions, a method for performing floating-point division of a dividend by a divisor for producing a quotient having a mantissa, said method comprising the steps of:

selecting a first table value using a linear approximation wherein said first table value approximates two/divisor;

selecting a second table value from said table lookup wherein said second table value approximates one/(divisor)$^2$ and said first table value and said second table value operate as linear correction terms;

determining an overall reciprocal approximation value by subtracting from said first table value the product of said divisor and said second table value;

determining a table approximation error value as being 1.0 minus the product of the divisor and the overall reciprocal approximation value;

determining a first approximation quotient by multiplying the dividend by the overall reciprocal approximation value;

determining a second reciprocal approximation value by adding the overall reciprocal approximation value to the product of the overall reciprocal approximation and the table approximation error value;

generating a second table approximation error value by subtracting from the dividend the product of the divisor and the first approximation quotient;

determining a resultant quotient by adding said first approximation quotient to the product of said second reciprocal approximation value and said second approximation error value.

2. The method according to claim 1 further comprising the steps of:

performing an early exit check to confirm whether said resultant quotient has an acceptable accuracy; and upon determining said resultant quotient lacks acceptable accuracy, performing a rounding correction based on a given rounding boundary.

3. In a floating-point unit having multiply and add functions, a system for performing floating-point division of a dividend by a divisor for producing a quotient having a mantissa, said system comprising:

means for selecting a first table value from a table lookup using a linear approximation, wherein said first table value approximates two/divisor;

means for selecting a second table value from said table lookup wherein said second table value approximates the reciprocal of the divisor squared and said first table value and said second table value operate as linear correction terms;

means for determining an overall reciprocal approximation value by subtracting from said first table value the product of said divisor and said second table value;

means for determining a table approximation error value as being 1.0 minus the product of the divisor and the overall reciprocal approximation value;

means for determining a first approximation quotient by multiplying the dividend by the overall reciprocal approximation value;

means for determining a second reciprocal approximation value by adding the overall reciprocal approximation value to the product of the overall reciprocal approximation value and the table approximation error value;

means for generating a second table approximation error value by subtracting from the dividend the product of the divisor and the first approximation quotient;

means for determining a resultant quotient by adding said first approximation quotient to the product of said second reciprocal approximation value and said second table approximation error value.

4. The system according to claim 3 further comprising:

means for performing an early exit check to confirm whether said resultant quotient has an acceptable accuracy; and upon determining said resultant quotient lacks acceptable accuracy, means for performing a rounding correction based on a given rounding boundary.

* * * * *

UNITED STATES PATENT AND TRADEMARK OFFICE
CERTIFICATE OF CORRECTION

PATENT NO. : 5,563,818
DATED : October 8, 1996
INVENTOR(S) : Agarwal, et al.

It is certified that error appears in the above-indentified patent and that said Letters Patent is hereby corrected as shown below:

Column 5, line 63: insert --x-- before the second instance of "0.5"

Column 8, line 50: insert -- — -- before "ulp*ulp/4"

Title page, item [75],
<u>Inventors</u>:

Change "Freg" to --Fred--

Signed and Sealed this

Fourteenth Day of January, 1997

Attest:

BRUCE LEHMAN

*Attesting Officer*  *Commissioner of Patents and Trademarks*